United States Patent [19]
Stickford, Jr. et al.

[11] Patent Number: 5,697,435
[45] Date of Patent: Dec. 16, 1997

[54] HEAT EXCHANGER SYSTEMS

[75] Inventors: George Stickford, Jr., Dublin, Ohio;
Anthony C. De Vuono, Racine, Wis.;
Robert E. Hamos, Keller, Tex.;
William F. Raleigh, Santa Clarita, Calif.

[73] Assignee: Teledyne Industries, Inc., Los Angeles, Calif.

[21] Appl. No.: 211,553
[22] PCT Filed: Dec. 22, 1993
[86] PCT No.: PCT/US93/12704
  § 371 Date: Dec. 26, 1996
  § 102(e) Date: Dec. 26, 1996
[87] PCT Pub. No.: WO95/17637
  PCT Pub. Date: Jun. 29, 1995
[51] Int. Cl.$^6$ .................................... F28F 13/08
[52] U.S. Cl. .......... 165/146; 122/235.23; 165/DIG. 481; 165/910
[58] Field of Search .............. 122/235.23; 165/146, 165/147, 173, 910, DIG. 481, DIG. 482

[56] References Cited

U.S. PATENT DOCUMENTS 1,509,782  9/1924  Samuelson ............... 165/110
4,784,218  11/1988  Holl ....................... 165/109.1
4,957,160  9/1990  Raleigh .................. 165/160

FOREIGN PATENT DOCUMENTS 395695  8/1973  U.S.S.R. .

*Primary Examiner*—Allen J. Flanigan
*Attorney, Agent, or Firm*—Benoit Law Corporation

[57] ABSTRACT

Heat is transferred from a first fluid to a cooler second fluid with a heat exchanger having heat exchanger tubes in which the cooler second fluid flows, preferably in a counterflow to the first fluid. The heat exchanger tubes are arranged in more than three rows of heat exchanger tubes. The first fluid proceeds successively downstream through such rows in heat-transfer relationship with the heat exchanger tubes. Each downstream row of heat exchanger tubes has less throughput area for the first fluid than an adjacent upstream row of heat exchanger tubes as among at least the first three rows of heat exchanger tubes in the direction of flow of the first fluid. Each downstream row of heat exchanger tubes may have less heat exchanger tubes than an adjacent upstream row of heat exchanger tubes as among at least the first three of the rows of heat exchanger tubes in the direction of flow of the first fluid. The heat exchanger tubes preferably are arranged in triangular or Y-shaped patterns in heat exchangers presenting a flow area of diminishing width for the first fluid.

67 Claims, 6 Drawing Sheets

HEAT EXCHANGER SYSTEMS

FIELD OF INVENTION

The subject invention relates to methods and apparatus for transferring heat among different fluids, to heat exchangers, and to water heaters.

BACKGROUND

Various methods and apparatus for transferring heat among different fluids are well known. One example is the familiar kind of heat exchanger in which one fluid in the heat exchanger flows through heat exchanger tubes while another fluid flows in heat-transfer relationship past such tubes. In many commercial units, the heat exchanger tubes are arranged in a couple of sometimes staggered rows essentially transversely to the flow of the latter other fluid.

Advantageously, the fluids participating in the heat exchange flow in a thermal counterflow. For example, in the case of gas-fired water heaters, cold water is flowed first through the row of heat exchanger tubes remote from the gas/air combustion chamber and, after having been thus heated, is last flown through the row of heat exchangers closest to the combustion chamber. In practice, this increases overall heat transfer and in particular improves heat transfer to the row of heat exchanger tubes away from the combustion chamber.

Some of such apparatus are condensing heat exchangers in which moisture in the fluid flowing past the heat exchanger tubes is condensed. In gas-fired heaters, such moisture is water vapor generated in the gas/air combustion process. A majority, of condensing heat exchanger are for heating air, but a significant number are for heating water. A familiar type of condensing water heater has a heat exchanger with two rows of finned copper tubes arranged in the above mentioned kind of thermal counterflow.

Even with thermal counterflow, by far the largest part of the heat exchange occurs in the row of heat exchanger tubes situated closest to the combustion chamber. Accordingly, flash boiling in these heat exchanger tubes must be avoided unless the objective of the particular heater is steam generation.

Conversion of water to steam eliminates the heat sink effect of the water flowing in the heat exchanger tubes. Tubes not designed for steam generation thus can be subjected to damage, including severe corrosion, melting or rupture, and failure at points where the tubes join headers and other parts of the heat exchanger.

Also high heat flux can cause precipitation of solids from the water onto the tube surface, sometimes to a degree which blocks water flow and causes overheating of the tube. This is sometimes called "liming".

Excessive velocity of the circulating heated fluid can be avoided by arranging heat exchanger tubes in parallel flow paths, which reduces pressure drop and tube erosion. However, the velocity of the circulating fluid should be high enough to avoid flash boiling and to enable circulating fluid to pull the heat exchanger tube temperature as close to that circulating fluid as possible.

These factors represent conflicting considerations in conventional heat exchanger design. Even where tradeoffs between conflicting design factors have been successfully implemented, either the efficiency of heat transfer has remained in the eighty-percent range, or higher efficiencies have come at a price of increased space and material requirements, and thereby cost.

Subjecting the flow of the cooler fluid to turbulation in the heat exchanger tubes has helped the fluid-side heat transfer, while baffles have been used to confine the flow of the hotter fluid to spaces between fins of finned heat exchanger tubes also for improved heat transfer. However, such measures have had only a modest effect on overall efficiency and have not substantially reduced space and material requirements and costs.

SUMMARY OF THE INVENTION

It is a general object of the invention to overcome the drawbacks and to meet the needs set forth above or otherwise apparent in this disclosure.

It is a germane object of the invention to provide improved methods and apparatus for transferring heat from a first fluid to a cooler second fluid.

It is a related object of the invention to provide improved heat exchanger systems and improved heat exchangers.

It is also an object of the invention to provide for an improved circuiting of the cooler second fluid relative to the hotter first fluid, and to provide the designer and the engineer with options to program optimum heat transfer at minimum exposure of the heat exchanger to damage.

It is a related object of the invention to provide for the maximum transfer of heat between counterflowing fluids.

Other objects of the invention will become apparent in the further course of this disclosure.

The invention resides in a method of transferring heat from a first fluid to a cooler second fluid with a heat exchanger having heat exchanger tubes, and, more specifically, resides in the improvement comprising, in combination, providing a heat source, providing the first fluid from that heat source, arranging the heat exchanger tubes on a triangle, with a first number of heat exchanger tubes being exposed to that heat source and being located at and distributed along a base of said triangle, and a second number of heat exchanger tubes being located at and between sides of the triangle between the base and an opposite apex of the triangle, and at least one further heat exchanger tube being located at and apex of the triangle, providing for a flow of the first fluid successively in heat-transfer relationship with the first number of heat exchanger tubes, with the second number of heat exchanger tubes, and with the further heat exchanger tube, providing water to be heated as the cooler second fluid, and heating that water by providing for a flow of that water through the heat exchanger tubes.

The invention resides also in a method of transferring heat from a first fluid to a cooler second fluid with a heat exchanger having heat exchanger tubes, and, more specifically, resides in the improvement comprising, in combination, arranging the heat exchanger tubes on a triangle, with a first number of such heat exchanger tubes being located at and distributed along a base of that triangle, and a second number of such heat exchanger tubes being located at and between sides of that triangle between its base and an opposite apex of that triangle, and at least one further heat exchanger tube being located at that apex of the triangle, subdividing the first number of heat exchanger tubes into sets of heat exchanger tubes, connecting such sets of heat exchanger tubes in series with each other, providing for a flow of first fluid in heat-transfer relationship with such sets of heat exchanger tubes of the first number of heat exchanger tubes, and successively with the second number of heat exchanger tubes, and with the further heat exchanger tube, and providing for a flow of cooler second fluid through the heat exchanger tubes including in series through the sets of heat exchanger tubes while exposed to the first fluid flow.

The invention resides also in a method of transferring heat from a first fluid to a cooler second fluid with a heat exchanger having heat exchanger tubes, and, more specifically, resides in the improvement comprising, in combination, arranging the heat exchanger tubes on a triangle, with a first number of these heat exchanger tubes being located at and distributed along a base of such triangle, and a second number of such heat exchanger tubes being located at and between sides of that triangle between its base and an opposite apex of such triangle, and at least one further heat exchanger tube being located at the apex of the triangle, providing additional heat exchanger tubes downstream of that apex in the direction of flow of the first fluid, locating the further heat exchanger tube and the additional heat exchanger tube on the stem of a figure-Y whose arms coincide with the sides of the triangle, providing for a flow of first fluid successively in heat-transfer relationship with the first number of heat exchanger tubes, with the second number of heat exchanger tubes, and with the further heat exchanger tube, and providing for a flow of cooler second fluid through the heat exchanger tubes.

The invention resides also in a method of transferring heat from a first fluid to a cooler second fluid with a heat exchanger having heat exchanger tubes, and, more specifically, resides in the improvement comprising, in combination, arranging the heat exchanger tubes transversely to a direction of first fluid flow in more than three rows of heat exchanger tubes in a Y-shaped pattern having a stem and having V-shaped arms on that stem, providing for a flow of first fluid successively downstream through rows of heat exchanger tubes in heat-transfer relationship with the heat exchanger tubes, providing each downstream row of heat exchanger tubes with less heat exchanger tubes than an adjacent upstream row of heat exchanger tubes as among at least the first three of the rows of heat exchanger tubes in the direction of first fluid flow, and providing for a flow of cooler second fluid through the heat exchanger tubes.

The invention resides also in a method of transferring heat from a first fluid to a cooler second fluid with a heat exchanger having heat exchanger tubes, and, more specifically, resides in the improvement comprising, in combination, providing a heat source, providing the first fluid from that heat source, arranging the heat exchanger tubes transversely to a direction of first fluid flow in more than three rows of heat exchanger tubes, providing for a flow of the first fluid successively downstream through the rows of heat exchanger tubes in heat-transfer relationship with the heat exchanger tubes, providing each downstream row of heat exchanger tubes with less heat exchanger tubes than an adjacent upstream row of heat exchanger tubes as among at least the first three of the rows of heat exchanger tubes in the direction of first fluid flow, providing water to be heated as the cooler second fluid, and heating that water by providing for a flow of the water fluid through the heat exchanger tubes.

The invention resides also in apparatus for transferring heat from a first fluid to a cooler second fluid with a heat exchanger having heat exchanger tubes, and, more specifically, resides is the improvement comprising a source of the first fluid including a heat source, and a heater for the cooler second fluid, comprising in combination a first number of heat exchanger tubes located at and distributed along a base of a triangle and exposed to the heat source, a second number of heat exchanger tubes located at and between sides of the triangle between the base and an opposite apex of the triangle, at least one further heat exchanger tube at the apex of the triangle, a fluid flow passage for the first fluid extending successively in heat-transfer relationship with the first number of heat exchanger tubes, with the second number of heat exchanger tubes, and with the further heat exchanger tube, and a fluid flow circuit for said cooler second fluid extending through the heat exchanger tubes.

The invention resides also in apparatus for transferring heat from a first fluid to a cooler second fluid with a heat exchanger having heat exchanger tubes, and, more specifically, resides in the improvement comprising, in combination, a first number of heat exchanger tubes located at and distributed along a base of a triangle and subdivided into sets of heat exchanger tubes connected in series with each other, a second number of heat exchanger tubes located at and between sides of the triangle between its base and an opposite apex of that triangle, at least one further heat exchanger tube at that apex of the triangle, a fluid flow passage for the first fluid extending successively in heat-transfer relationship with the first number of heat exchanger tubes including the sets of heat exchanger tubes, and with the second number of heat exchanger tubes, and with the further heat exchanger tube, and a fluid flow circuit for the cooler second fluid extending through the heat exchanger tubes including the sets of heat exchanger tubes connected in series with each other.

The invention resides also in apparatus for transferring heat from a first fluid to a cooler second fluid with a heat exchanger having heat exchanger tubes, and, more specifically, resides in the improvement comprising, in combination, a first number of heat exchanger tubes located at and distributed along a base of a triangle, a second number of the heat exchanger tubes located at and between sides of such triangle between its base and an opposite apex of that triangle, at least one further heat exchanger tube at the apex of the triangle, additional heat exchanger tubes downstream of that apex in the direction of first fluid flow, the further heat exchanger tubes and the additional heat exchanger tubes located on the stem of a figure-Y whose arms coincide with the sides of the triangle, a fluid flow passage for said first fluid extending successively in heat-transfer relationship with the first number of heat exchanger tubes, with the second number of heat exchanger tubes, and with the further heat exchanger tube, and a fluid flow circuit for cooler second fluid extending through the heat exchanger tubes.

The invention resides also in apparatus for transferring heat from a first fluid to a cooler second fluid with a heat exchanger having heat exchanger tubes, and, more specifically, resides in the improvement comprising, in combination, heat exchanger tubes extending transversely to a direction of first fluid flow and arranged in more than three rows of heat exchanger tubes, each downstream row of heat exchanger tubes having less heat exchanger tubes than an adjacent upstream row of heat exchanger tubes as among at least the first three of the rows of heat exchanger tubes in the direction of first fluid flow, such heat exchanger tubes being in a Y-shaped pattern having a stem and having V-shaped arms on that stem, a fluid flow passage for first fluid extending successively downstream through the rows of heat exchanger tubes, and a fluid flow circuit for cooler second fluid extending through the heat exchanger tubes.

The invention resides also in apparatus for transferring heat from a first fluid to a cooler second fluid with a heat exchanger having heat exchanger tubes, and, more specifically, resides the improvement comprising a source of first fluid including a heat source, and a heater for the cooler second fluid, comprising in combination heat exchanger tubes extending transversely to a direction of first fluid flow and arranged in more than three rows of heat exchanger tubes, each downstream row of heat exchanger tubes having less heat exchanger tubes than an adjacent upstream row of heat exchanger tubes as among at least the first three of the rows of heat exchanger tubes in the direction of first fluid flow, a fluid flow passage for the first fluid extending successively downstream through the rows of heat exchanger tubes, and a fluid flow circuit for the cooler second fluid extending through the heat exchanger tubes.

According to a preferred embodiment of the invention, the fluid flow circuit for the cooler second fluid starts with the most downstream heat exchanger tube or row and proceeds through the rows or second number of heat exchanger tubes to the most upstream row in a counterflow to the first fluid flow.

Additionally or alternatively pursuant to a preferred embodiment of the invention, the fluid flow passage for the first fluid diminishes in width in the direction of first fluid flow and to referral includes a fluid flow channel containing said most downstream row and extending in that direction of first fluid flow.

BRIEF DESCRIPTION OF THE DRAWINGS

The subject invention and its various aspects and objects will become more readily apparent from the following detailed description of preferred embodiments thereof, illustrated by way of example in the accompanying drawings, in which like reference numerals designate like or equivalent parts, and in which.

DESCRIPTION OF PREFERRED EMBODIMENTS

Figure 1:
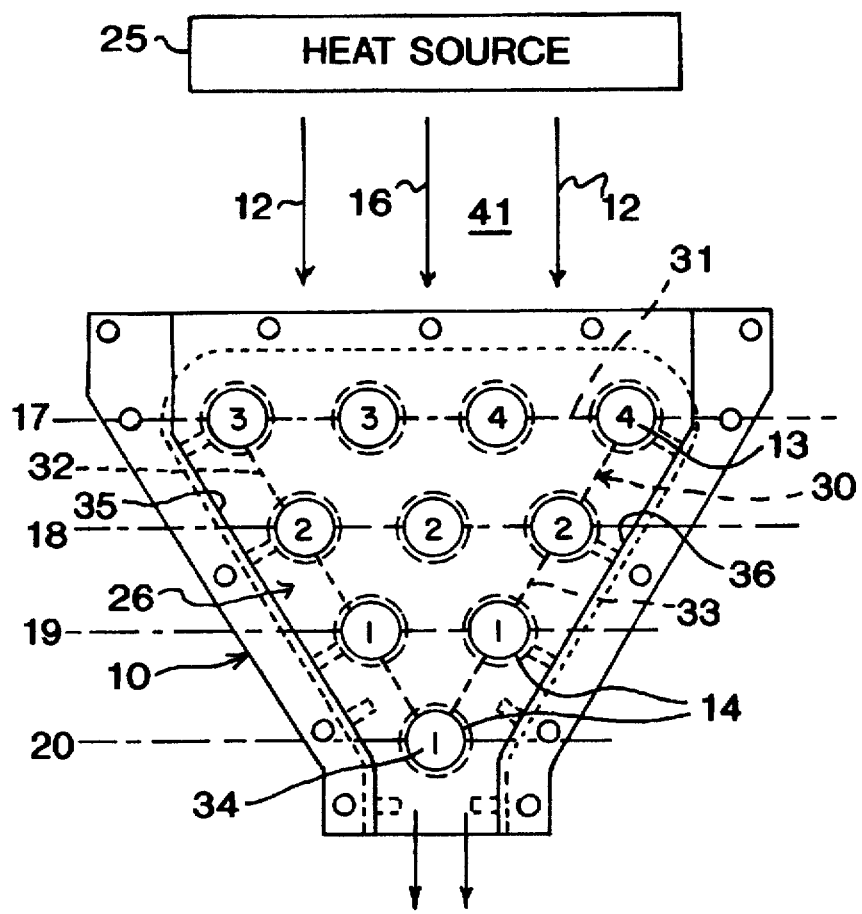
FIG. 1 is somewhat diagrammatic side view of heat exchanger according to an embodiment of the invention, with one of the side header structures removed for better visibility of the inside of the heat exchanger.

The drawings illustrate embodiments of the invention, in the form of methods and apparatus for transferring heat from a first fluid 12 to a cooler second fluid 13 with a heat exchanger 10 or 100 having heat exchanger tubes 14.

The illustrated preferred embodiments of the invention arrange the heat exchanger tubes 14 on a triangle 30 with a first number of the heat exchanger tubes being located at and distributed along a base 31 of that triangle, and a second number of the heat exchanger tubes being located at and between sides 32 and 33 of that triangle between its base 31 and an opposite apex 34 of that a triangle, and at least one further heat exchanger tube 14 being located at that apex of the triangle.

The invention provides for a flow of the first fluid 12 successively in heat-transfer relationship with the first number of heat exchanger tubes at triangle base 31, with the second number of heat exchanger .tubes, and with the further heat exchanger tube at the apex 34. This is what is referred to as "downstream" herein, even through it may be upstream as far as the second fluid 13 is concerned.

The invention provides for a flow of that cooler second fluid 13 through the heat exchanger tubes 14. According to a preferred embodiment of the invention, the flow of the cooler second fluid is started with the above mentioned further heat exchanger tube at the apex 34 of the triangle 30, and proceeds through the second number of heat exchanger tubes, and then through the first number of heat exchanger tubes at the base 31 of the triangle in a counterflow to the flow 16 of the first fluid 12.

Arranging the heat exchanger tubes in a triangular pattern and counterflowing the first and second fluids therein according to this embodiment of the invention improves the efficiency of the heat transfer, as more fully discussed below.

Pursuant to a preferred embodiment of the invention, the flow of the first fluid 12 is laterally confined to a fluid flow area or passage 26 of diminishing width in the direction 16 of flow of that first fluid. In practice, this prevent severe loss of velocity of the first fluid 12 as it flows through the triangular pattern 30 and past the downstream-most heat exchanger tube at the apex 34. In practice the velocity of the first fluid 12 thus is essentially maintained, even as such first fluid is cooled and has its volume proportionately reduced by transfer of heat at successive rows of heat exchanger tubes 17, 18, 19, 20.

I the illustrated embodiments of heat exchanger 10 and 100, the fluid flow area or passage 26 is provided with a first side 35 substantially paralleling a first side 32 of the triangle 30 between its base 31 and apex 34, and with an opposite second side 36 substantially paralleling the opposite side 33 of triangle.

The cooler second fluid 13 is flown in a succession of fluid flow paths from the further heat exchanger tube 14 at the triangle apex 34 through to the first number of heat exchanger tubes at the triangle base 31, with each parallel fluid flow path including at least two heat exchanger tubes 14. In practice, this enables a "programming" of the fluid flow and heat transfer in avoidance of such partially conflicting factors as excessive pressure drop of the heated fluid, liming, flash boiling and tube erosion or rupture, and in favor of higher efficiency in the heat transfer, and a cooler and dryer exhaust product after the heat exchange.

According to an embodiment of the invention the first number of heat exchanger tubes is an even number of heat exchanger tubes in the first row 17 or at the base 31 of the triangle 30. That even number of heat exchanger tubes is evenly subdivided into sets of parallel heat exchanger tubes, and such sets of parallel heat exchanger tubes are connected in series with each other. The second fluid 13 is flown in series through such sets of parallel heat exchanger tubes while exposed to the heat of the first fluid flow 12. In practice, this furthers the objective of an improved heat transfer with the velocity of the circulating fluid 13 being high enough to avoid liming and flash boiling, but low enough to avoid erosion.

In the illustrated heat exchangers 10 and 100, the even number of first heat exchanger tubes at the base 31 of the triangle and the second number of heat exchanger tubes in that triangle 30 and the further heat exchanger tubes at the apex 34 are subdivided into sets of parallel heat exchanger tubes, and such sets of parallel heat exchanger tubes are connected in series with each other. The second fluid 13 is again flown in series through such sets of parallel heat exchanger tubes while exposed to the heat of the first fluid flow 12.

Figure 10:
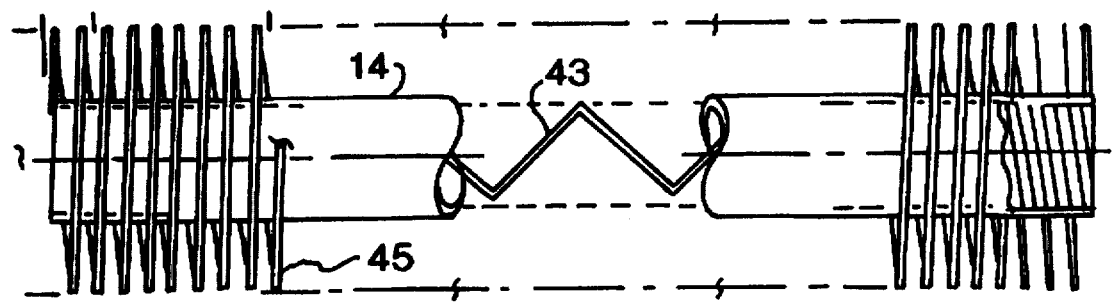
FIG. 10 is a side view, on an enlarged scale, of a finned and baffled heat exchanger tube useful in heat exchangers herein shown.
Figure 11:
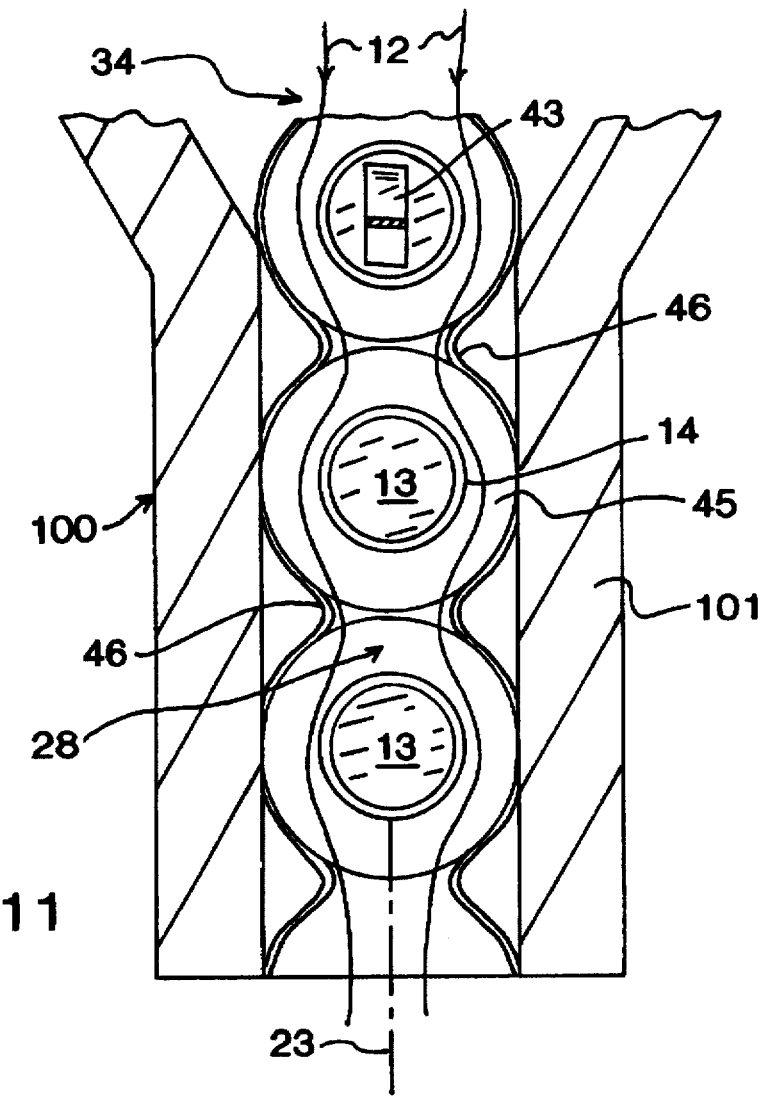
FIG. 11 is an enlarged showing of a bottom portion of the heat exchanger of FIGS. 4, 5 or 6, with useful fins and with baffles on and in heat exchanger tubes similar to FIG. 10.

To reduce liming and increase heat transfer at the side of the second fluid, the flow of that cooler second fluid 13 may be subjected to turbulation in the heat exchanger tubes 14, such as with the kind of internal serpentine, accordion or other baffle 43 shown in FIGS. 10 and 11.

To increase heat transfer from the first fluid 12 to heat exchanger tubes 14, such tubes may be provided with heat exchanger fins 45. In this respect, certain heat exchanger tubes, such as the tubes in the first row 17 at triangle base 31 exposed to the heat source 25 or combustion chamber 41, could be provided bare without heat exchanger fins or with only small fins to avoid flash boiling or overheating, while other heat exchanger tubes, such as those below the first row 17 or at and below the apex 34 can be provided with larger fins 45 for an increased heat transfer from the by then cooled-down first fluid 12. While this is within the scope of the invention, embodiments of the invention prefer using the same kind of finned heat exchanger tubes throughout the heat exchanger, and "programming" the flow of the second fluid through paths or passes of fluid flow as herein disclosed.

Also, as shown in FIG. 11, baffles 46 may be used to confine the flow of the first fluid 12 to spaces between the fins 45 of at least some of the heat exchanger tubes 14. By way of example, such external baffles 46 may be used on the heat exchanger tubes at and below the triangle apex 34 where the first fluid 12 has been cooled down and shrunk in volume by the preceding heat exchanger tubes closer to the heat source 25 or combustion chamber 41.

In the heat exchanger 100, additional heat exchanger tubes 14 are located downstream of the apex 34 in the direction of flow 16 of the first fluid 12 pursuant to a preferred embodiment of the invention. Such additional heat exchanger tubes are seen at 28 in FIG. 4 and also in FIGS. 5 to 9 and 11.

The cooler second fluid 13 is first flown through at least the additional heat exchanger tubes and through the further heat exchanger tube at and below the apex 34 (see FIGS. 4, 7, 9 and 11) before proceeding through the second number of heat exchanger tubes at and between the sides 32 and 33 or 35 and 36, and then through the first number of heat exchanger tubes at the triangle base 31 or in the first row 17 in a counterflow to the flow 16 of the first fluid 12.

According to a preferred embodiment of the invention, these further heat exchanger tube and additional heat exchanger tubes are located on the stem 23 of a figure-Y whose arms coincide with the sides 32 and 33 of the triangle 30. In other words dotted lines 32 and 33 represent the arms and 23 represents the stem of that figure-Y.

Where additional heat exchanger tubes are located downstream of the apex 34 in the direction of flow 16 of the first fluid 12, the cooler second fluid 13 is first flown preferably in parallel through these additional heat exchanger tubes and through that further heat exchanger tube before proceeding through the second number of heat exchange tubes, at and between in the arms of the figure-Y or sides of the triangle 30 and then through the first number of heat exchanger tubes in a counterflow to the flow of the first fluid 12.

In this manner, heat from the cooled-down first fluid 12 is transferred very efficiently to the cool second fluid 13. Even though the second fluid 13 is coolest where it enters the heat exchanger in row 23 or in the portion shown in FIG. 11, the smallest difference between the temperature of the first fluid 12 and the temperature of the second fluid 13 is in the "approach zone" 28, where the temperatures of the first and second fluids 12 and 13 approach each other, since the first fluid 12 has transferred most of its heat to the heat exchanger tubes ahead of the apex 34.

A specific objective of configuring the heat exchanger 100 in a "Y" layout is to provide a narrow flow cross-section in the approach zone 28 thereby increasing convective-heat transfer from the first fluid 12. By the time combustion gases or other first fluids 12 have reached this zone 28, their absolute temperature has fallen to on the order of one-fifth of that in the combustion chamber 41. Their volume has decreased proportionately which drastically reduces their velocity. In this respect, convective heat transfer coefficients are proportional to fluid velocity (typically to about the 0.6th power for turbulent flow), so heat transfer suffers in that region, which is why prior-art heat exchangers have performed so poorly in regions downstream of their zone closest to the combustion chamber or first fluid source.

The currently discussed aspect of the invention provides measures to correct this. The narrowed cross-section at the bottom 34 of the "Inverted Delta" arrangement in the heat exchanger 10, and particularly the narrow channel 28 along the stem 23 of the figure-Y arrangement of the heat exchanger 100, provide the velocity boost necessary to take advantage of the phenomenon just described.

In addition to this convergence of the flow passage 26, flue-side baffles 46 along the sides of the lower portion 101 of the heat exchanger as shown in FIG. 11 direct combustion gas flow into the fin passages 45 of the heat exchanger tubes 14. Without these baffles, combustion gas or first fluid flow 12 at the outside edges would contact the fin tips only occasionally. Most of their travel would be through void spaces between tube rows.

Pursuant to this embodiment of the invention, about 5% of the total heat transfer occurs in the approach zone 23. This is very good when one considers that the temperature difference available to drive the process can be as low as about 30 degrees Celsius or 50 degrees Fahrenheit, while the temperature difference at the combustion zone between the first and second fluid can be on the order of 550 to 1100 degrees Celsius or some 1000 to 2000 degrees Fahrenheit.

Between (a) the row 17 of heat exchanger tubes exposed to the combustion chamber 41 or otherwise receiving the first fluid 12 at its highest temperature, and (b) the second fluid approach zone 28, there is (c) an intermediate zone of the heat exchanger 10 or 100, occupied by rows 18 and 19 of heat exchanger tubes 14. This is a transition zone characterized by conventional convective heat transfer. In practice, this zone accounts for about 30% of the total heat transfer in the illustrated heat exchangers. A representative distribution of heat transfer percentages is 65%-30%-5%, for the first zone or row 17 at the combustion chamber 41, for the transition zone, and for the final zone 28, respectively. This results in a better usage of material and space than was possible with prior-art heat exchangers.

Because heat transfer in this intermediate zone has neither the very high heat flux of the combustion zone 17, nor the low temperature difference of the approach zone 28, its design is less critical than either. Accordingly, the necessary flue-side heat transfer surface is provided in the knowledge that water-side heat transfer will be adequate in spite of low water velocity. Heat flux is substantial in this zone because combustion gases 12 are still quite hot. However, water-side convective heat transfer coefficients are very good even at low water velocity (in these explanations, "combustion gases" and "flue" stands for "first fluid 12," while "water" stands for "second fluid 13", but the explained principles are applicable to other first and second fluids and their respective heat transfer).

As in the approach zone 28, a converging cross-section in the direction of combustion gas flow 16 is utilized to enhance intermediate zone flue-side heat transfer. Combustion product volume decrease due to falling temperature is offset in this way.

Flue-side baffles may be used along the edges to accomplish the same effect as in the approach zone 28: to redirect combustion gas flow 16 into the fin passages 45 rather than allowing it to pass uselessly through void space between tubes 14.

Water-side baffles 43, the same or similar to those used in the approach zone 28, can be used in the intermediate zone tubes. As in the approach zone tubes, this increases water-side turbulence and enhances heat transfer.

Steam flashing and liming generally are not a problem in the intermediate zone because water temperatures, heat flux and inside tube surface temperatures are relatively low.

With these principles of the invention or of its embodiments in mind, the judicious circuiting of the cooler second fluid 13 relative to the hotter first fluid 12 will now be considered on the basis of the examples illustrated in the drawings.

Figure 2:
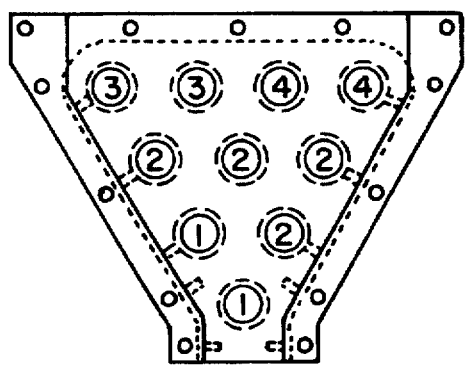
FIG. 2 is a view similar to FIG. 1, on a reduced scale, showing a different fluid flow path according to another embodiment of the invention.
Figure 3:
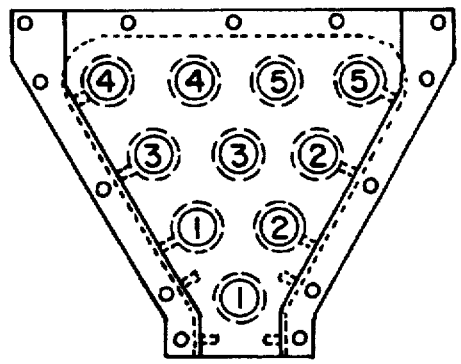
FIG. 3 is a view similar to FIG. 1, on a reduced scale, showing another fluid flow path according to a further embodiment of the invention.
Figure 4:
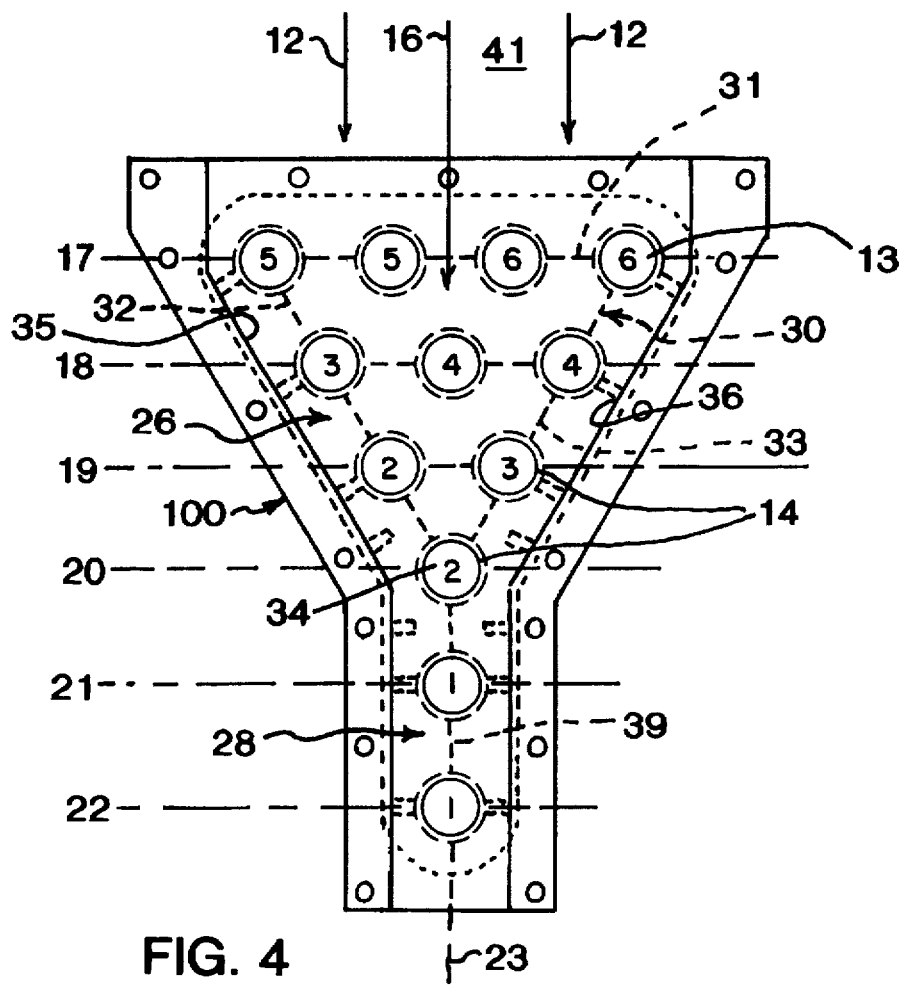
FIG. 4 is a view similar to FIG. 1 in the form of a side view of another heat exchanger according to a preferred embodiment of the invention.

In this respect, sets of parallel fluid flow paths are numbered consecutively in FIGS. 1 to 6, starting with a "1" for the most downstream set and culminating in a "6" for the most upstream heat exchanger tubes in the heat exchanger 100 of FIG. 4.

Within the scope of the invention, all heat exchanger tubes 14 could be arranged in series for a flow of the second fluid 13 therethrough. However, provision of at least two parallel fluid flow paths is presently preferred.

By way of example, looking first at FIG. 1 for the heat exchanger 10, it is seen that the cooler second fluid 13 first flows in parallel through three heat exchanger tubes labeled "1" in downstream rows 20 and 19, and then flows in parallel through three further heat exchanger tubes labeled "2" in the next upstream row 18, and then flows in parallel through two of the heat exchanger tubes labeled "43" in the upstream-most row 17, and then flows in parallel through the remaining two of the heat exchanger tubes in that upstream-most row 17.

In other words, putting the rank 1, 2, 3 ... and the number of each set of parallel heat exchanger tube in parentheses, we may write for the run of the cooler fluid 13 in the heat exchanger 10 according to FIG. 1:

(1—1—1)-(2—2—2)-(3—3)-(4—4)

Figures 5, 6:
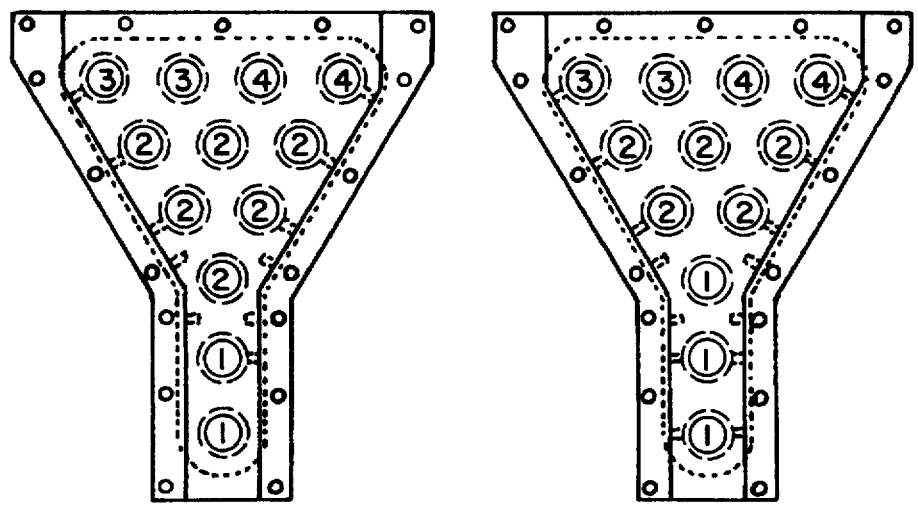
FIG. 5 is a view similar to FIG. 4, on a reduced scale, showing a different fluid flow path according to another embodiment of the invention.
FIG. 6 is a view similar to FIG. 4, on a reduced scale, showing a different fluid flow path according to yet another embodiment of the invention.

Alternative runs are illustrated
as (1—1)-(2—2—2—2)-(3—3)-(4—4) in FIG. 2,
as (1—1)-(2—2)-(3—3—3)-(4—4)-(5—5) in FIG. 3,
as (1—1)-(2—2)-(3—3)-(4—4)-(5—5)-(6—6) in FIG. 4,
as (1—1)-(2—2—2—2—2—2)-(3—3)-(4—4) in FIG. 5, and
as (1—1—1)-(2—2—2—2—2)-(3—3)-(4—4) in FIG. 6, while the hotter fluid 12 flows in a counter-flow 16 to such run of the cooler fluid 13 for optimum heat transfer.

The circuiting according to FIGS. 1 to 6 present various flow patterns for the water or other second fluid 13. The pressure drop for that second fluid is highest for the flow pattern of FIG. 4. Lower pressure drops are observed for the flow 2 patterns of FIGS. 2, 5 and 6, but the flow of the second fluid 13 is less balanced in these flow patterns.

In particular, the flow patterns of FIGS. 2, 5 and 6 are unbalanced to boost the velocity of the second fluid 13 in the critical first pass in the approach zone, such as zone 28, while tolerating less velocity in the second pass 2—2—2 . . . —2 representing the above mentioned less critical intermediate zone. This is workable where the combustion gas or first fluid 12 has been significantly cooled by the first row 17 of heat exchanger tubes at the combustion chamber 41 or heat source 25, but still contains enough thermal energy for a significant heating of the second fluid 13 in from four to six heat exchanger tubes "2" connected in parallel through the headers.

From a further aspect of the invention, the drawings also illustrate methods and apparatus for transferring heat from a first fluid 12 to a cooler second fluid 13 with a heat exchanger 10 or 100, wherein the heat exchanger tubes 14 are arranged transversely to a direction of first fluid flow 16 in more than three rows of heat exchanger tubes. In this respect, the heat exchanger according to FIGS. 1 to 3 has four such transverse rows 17, 18, 19 and 20, and the heat exchanger 100 according to FIGS. 4 to 6 has six transverse rows 17, 18, 19, 20, 21 and 22 of heat exchanger tubes 14.

Embodiments of the invention again provide for a flow of the first fluid 12 successively downstream through the rows of heat exchanger tubes 17, 18, 19, et seq. in heat-transfer relationship with the heat exchanger tubes 14.

For at least the first half of the rows of heat exchanger tubes in the direction of first fluid flow 16, the illustrated embodiments provide each downstream row of heat exchanger tubes 18, 19 and 20 with less heat exchanger tubes 14 than an adjacent upstream row of heat exchanger tubes 17, 18, and 19, respectively. By way of example, the heat exchanger 100 provides the rows 17, 18, 19, 20, and 21 with four, three, two, and one heat exchanger tubes or tube 14, respectively, whereby as among at least the first half of the row of heat exchanger tubes 17 to 22 as seen in the direction of first fluid flow 16, each downstream row 18, 19 and 20 has less heat exchanger tubes (three, two, one heat exchanger tubes or tube, respectively) than an adjacent upstream row (four, three, two heat exchanger tubes, respectively). It will be noted in this respect that the expression "row" applies to as little as one heat exchanger tube, such as in the case of rows 20, 21, and 22, each of which has only one heat exchanger tube 14.

Also in the case of the heat exchanger 10, the phrase "at least the first half means as much as "all," since each downstream row 18, 19, and 20 has less tubes 14 than any upstream row 17, 18 and 19, respectively.

The illustrated embodiments of the invention also provide for a flow of the cooler second fluid 13 successively through the heat exchanger tubes starting with the most downstream row 20 for the heat exchanger 10, and 22 for the heat exchanger 100 and proceeding through the rows to the most upstream row 17 in a counterflow to the flow 16 of the first fluid 12.

As seen in the heat exchanger 10 and 100, the heat exchanger tubes 14 in adjacent rows 17 and 18, 18 and 19, 19 and 20, etc. preferably are staggered relative to each other, whereby heat transfer is optimized.

The most upstream one of the rows as seen in direction of flow 16 of the first fluid 12 extends transversely as a row to that direction of flow, as shown for the top row 17, and the adjacent downstream one of the rows in the direction of flow 16 also extends transversely as a row to that direction of flow, as shown for the next downstream row 18.

In this respect, as already mentioned above the expressions "upstream" and "downstream" refer to the direction 16 of the flow of the first fluid 12, since a gas burner or other source 25 of the first fluid 12 may be located above the heat exchanger, with that heat exchanger 10 or 100 being arranged as shown in the drawings for a downstream heat exchange, or such first fluid source 25 may be located below the heat exchange, with the heat exchanger 10 or 100 then being arranged up-side down, with the most upstream row 17 then being above row 18, and the most downstream row 20 or 22 then being above the row 19 or 21, respectively. Alternatively, the heat exchanger 10 or 100 and heat source 25 assembly may be arranged sideways or at a tilt, with "downstream" remaining downstream, and "upstream" remaining upstream for the rows of heat exchanger tubes as herein described.

In the heat exchangers 10 and 100 according to the preferred embodiment of the invention, the row 19 next downstream of the above mentioned adjacent one of rows (row 18) also extends transversely as a row to the direction of flow 16.

In both heat exchangers 10 and 100, the most downstream one of the rows, namely the row 20 or 22, respectively, is occupied by a single heat exchanger tube 14. As already mentioned above, a row can be defined by as little as a single heat exchanger to be within the scope of the invention.

On the other hand, a row of heat exchanger tubes need not necessarily extends transversely to the direction of first fluid flow 16. For example, as shown in the heat exchanger 100, there may be a row 23 defined by heat exchanger tubes 14 at 20 21 and 22. That row 23, stopping at level 20, then is the most downstream row in the heat exchanger 100. That most downstream row 23 of the rows 17, 18, 19 and 23 in the direction of flow extends in that direction of flow 16 and includes more than one of the heat exchanger tubes, such as the three heat exchanger tubes 14 shown at levels 20 to 22 for that vertical row 23.

Accordingly, pursuant to the embodiment shown in FIGS. 4 to 6, the most upstream row 17 extends or is arranged transversely to the direction of flow 16 of the first fluid 12, while the most downstream row 23 extends in that direction of first fluid flow 16. Conversely, the cooler second fluid 13 flows first through that aligned row 23 which is most downstream in the direction of first fluid flow 16, and flows last through the transverse row 17 which is most upstream in that direction of first fluid flow 16.

The flow 16 of the first fluid 12 is laterally confined to the rows 17 to 20 or 17, 18, 19 and 23 of heat exchanger tubes 14 to provide a fluid flow area or passage 26 of diminishing width in the direction of flow 16 of the first fluid 12.

In the heat exchanger 100, the flow of the first fluid 12 is laterally confined to the rows 17, 18, etc. of heat exchanger tubes 14 to a fluid flow area 26 of diminishing width in the direction of flow 16 of the first fluid 12, eventuating in a fluid flow channel 28 containing the most downstream row 23 aligned with, and extending in the direction of flow 16 of the first fluid 12.

Within the broad scope of the invention, this or any other method provides for each downstream row 18, 19, 20 of the heat exchanger tubes 14 less throughput area for the first fluid 12 than an adjacent upstream row 17, 18, 19, respectively, of heat exchanger tubes as among at least the first three of such rows in the direction of first fluid flow. In such a case, the number of heat exchanger tubes 14 can, for instance, be equal in each row, but baffles or obstruction (not shown) between the heat exchanger tubes in, say, the second row 18 may reduce the throughput for the first fluid 12 through such second row, while more baffles or other obstructions between heat exchanger tubes in the third row further reduce the throughput for that first fluid 12 through such third row, and so forth.

However, according to a preferred embodiment of the invention, the heat exchanger tubes 14 of the heat exchangers 10 and 100 are arranged on a triangle 30, with the first upstream one of the rows (row 17) being located on a base 31 of that triangle. An adjacent downstream one of the rows, such as row 18, is located between that base 31 and an opposite apex 34 of that triangle, and a further downstream heat exchanger tube, such as the tube 14 on row 20, is located on that apex of the triangle. There may be further rows of heat exchanger tubes 14 in the triangular pattern, such as already disclosed above with respect to the drawings.

Pursuant to a preferred embodiment of this aspect of the invention, the flow of the first fluid 12 is laterally confined to the rows of heat exchanger tubes to provide a fluid flow area 26 of diminishing width in the direction of the flow 16 of the first fluid, as already disclosed above.

According to a further embodiment of the invention the heat exchanger tubes 14 in the heat exchanger 100 are arranged in a Y-shaped pattern also as already disclosed above.

The flow of the first fluid 12 again may be laterally confined to a fluid flow area 26 of diminishing width in the direction of flow 16 of that first fluid, and such diminishing fluid flow area may be given a Y-shaped outline similar to and containing the Y-shaped pattern wherein said heat exchanger tubes 14 are arranged, as shown for the heat exchanger 100.

According to preferred embodiments of the invention, the cooler second fluid 13 is flown in a succession of parallel fluid flow paths from the most downstream row 20 for the heat exchanger 10 or 23 for the heat exchanger 100 through to the most upstream row 17 of heat exchanger tubes, with each parallel fluid flow path including at least two of the heat exchanger tubes 14 in the illustrated embodiments of the invention. This principle is illustrated by way of example in FIGS. 1 to 6.

In this respect, various flow patterns identical or similar to those disclosed above may again be used in these embodiments of the invention.

Headers omitted in FIGS. 1 to 6 for better visibility of the heat exchanger inside and heat exchanger tube patterns, may be of a conventional type adapted, of course, to the various embodiments.

Figure 7:
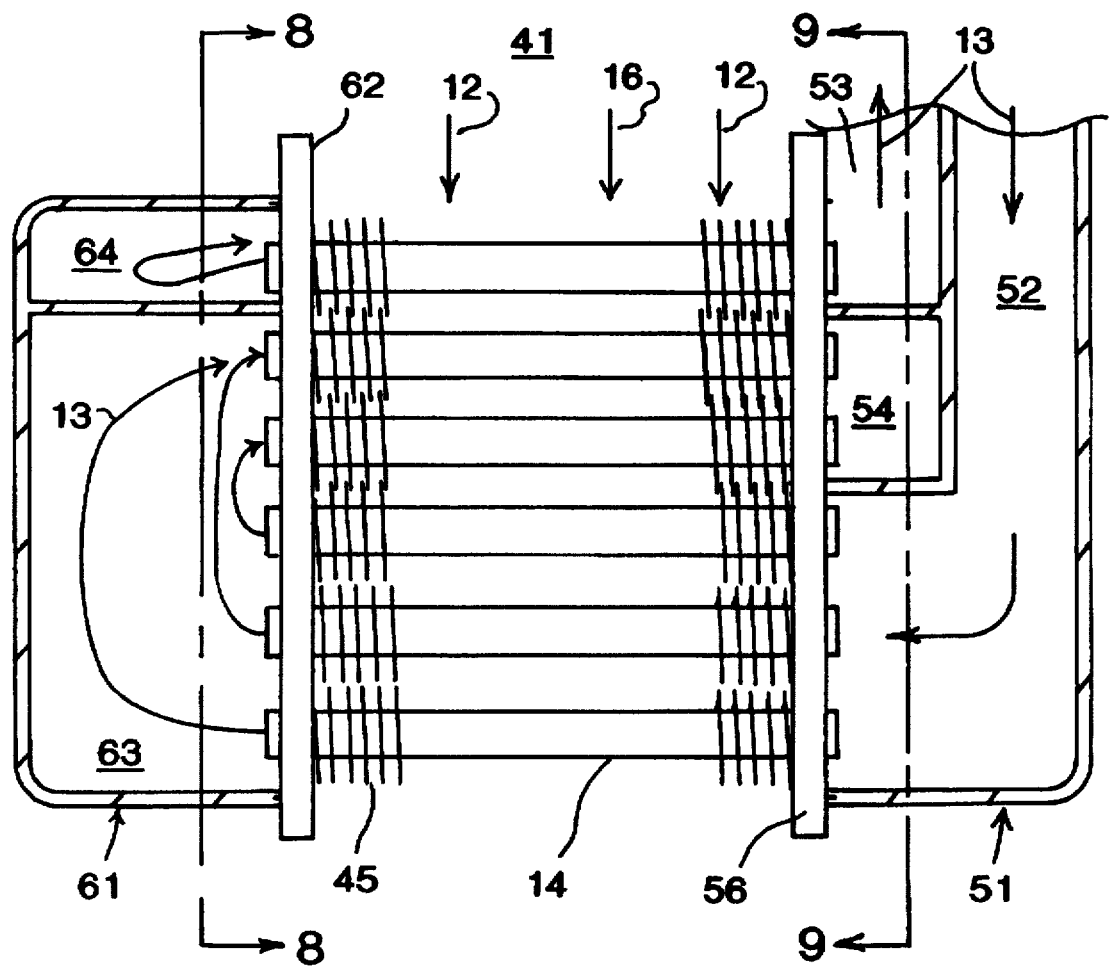
FIG. 7 is an elevation of the heat exchanger shown in FIG. 6, sectioned on the line 7—7 in FIG. 8.
Figure 8:
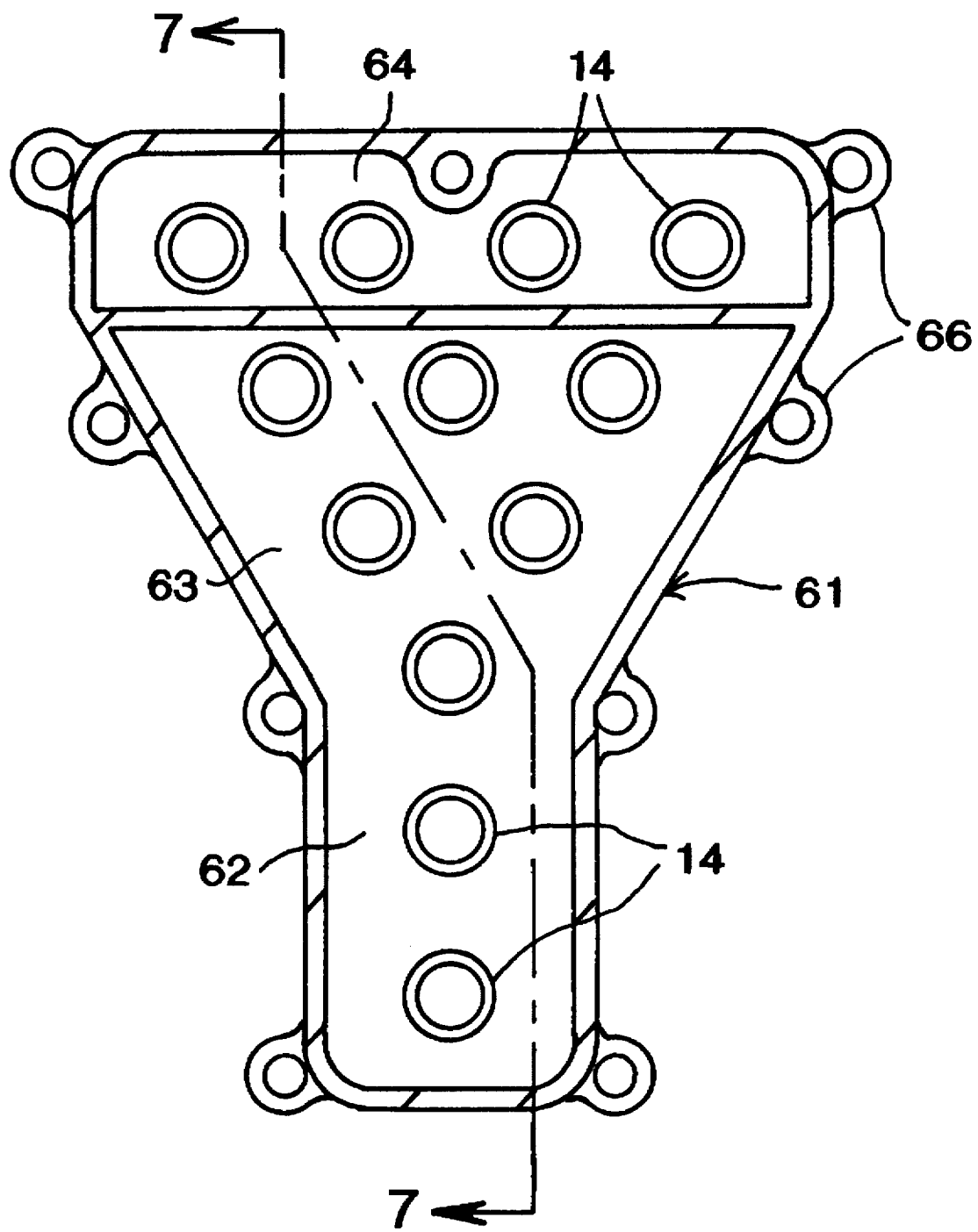
FIG. 8 is a section taken on the line 8—8 in FIG. 7.
Figure 9:
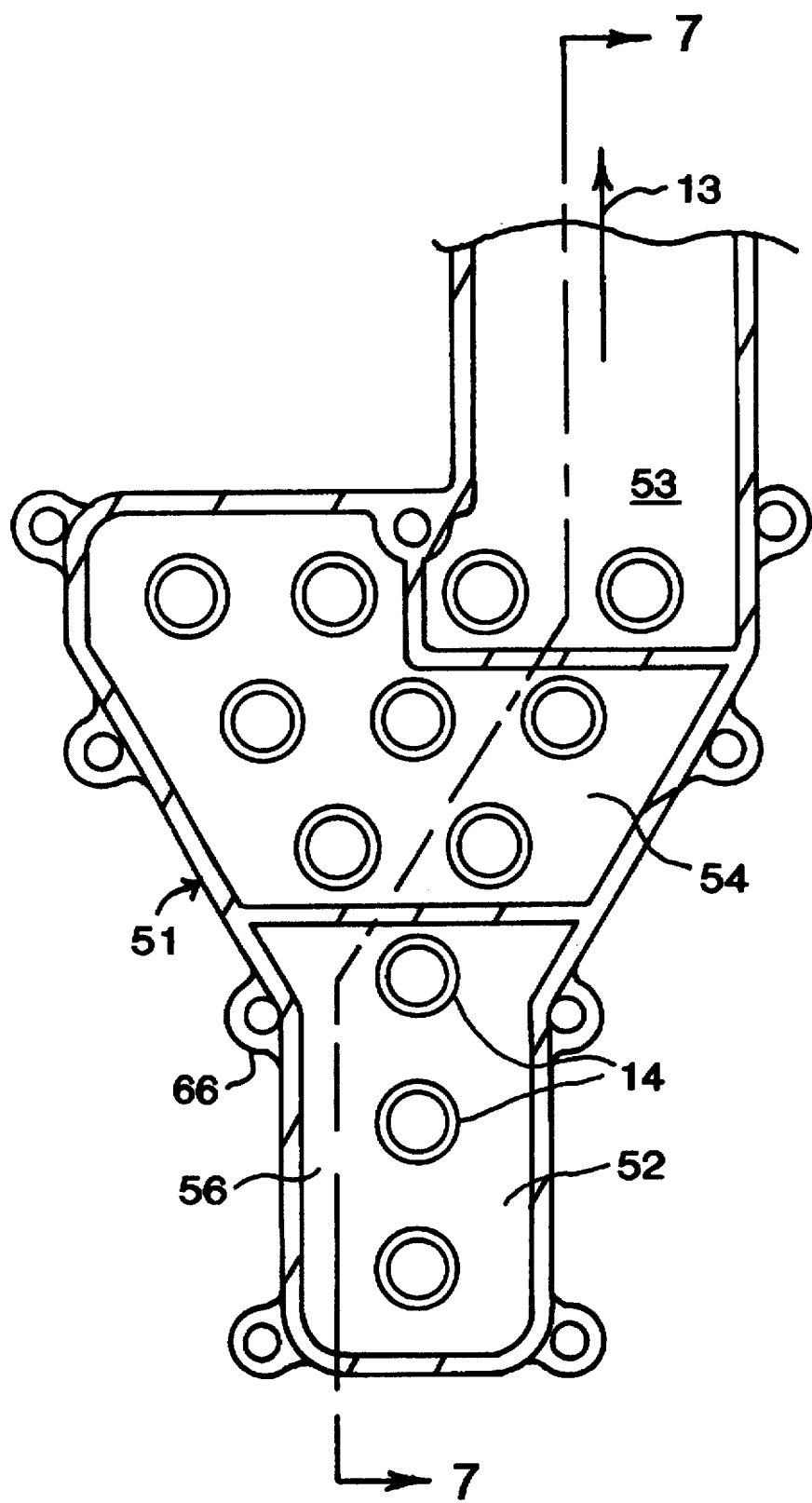
FIG. 9 is a section taken on the line 9—9 in FIG. 7 and may be viewed as a sectioned showing of the header structure that was removed in the side view of FIG. 6 in order to show the inside of that heat exchanger.

By way of example, FIGS. 7 to 9 show headers suitable for the embodiment of FIG. 6, for instance.

FIGS. 7 and 9 show a first header structure 51 defining an inlet 52 for the cooler second fluid 13, an outlet 53 for the heated second fluid 13, and an internal flow chamber 54 for such second fluid, as also seen in FIG. 9.

That first header structure 51 also has a header plate 56, seen in FIGS. 7 and 9, through which corresponding first ends of the heat exchanger tubes 14 extend in sealed relationship thereto.

FIGS. 7 and 8 show a second header structure 61 that has a header plate 62 through which the opposite second ends of the heat exchanger tubes extend in sealed relationship thereto. Such kind of header plates 56 and 62 are shown only in dotted outline in FIGS. 1 to 6 so as not to obstruct the view of the inside of the heat exchanger 10 or 100.

As seen in FIGS. 7 and 8, the second header structure 61 defines two internal chambers 63 and 64 for a flow of the second fluid 13.

It is thus easily seen that the header structures 51 and 61 realize the flow paths or circuit shown in FIG. 6 and described above in conjunction therewith. However, various kinds of header structures with different internal fluid chambers may be provided to realize other fluid flow patterns, such as the various fluid flow circuits shown in FIGS. 1 to 5, for instance.

The header structures may, for instance, have mounting lugs 66 to be attached by bolts (not shown) to flanges of the heat exchanger chamber, such as indicated at 67 in FIG. 6.

The invention and embodiments thereof may be used in all kind of heating and other apparatus.

By way of example, the following patents are incorporated by reference herein to show examples of apparatus and appliances in which the methods and apparatus of the subject invention may be used, or to show examples of baffles that may be used in the practice of the subject invention:

U.S. Pat. No. 5,163,508, by Robert E. Hamos, issued Nov. 17, 1992 for Heat Exchanger Baffle System that may be used in the practice of the invention.

U.S. Pat. No. 4,957,160, by William F. Raleigh, issued Sep. 18, 1990 for a Self-Clamping Baffle for Tubular Structures, such as finned heat exchanger tubes that may be used in the practice of the invention.

U.S. Pat. No. 4,893,609, by Giordani et al., issued Jan. 16, 1990 for Wind-Resistant Outdoor Heating Appliance and showing a heat exchanger with staggered heat exchanger tubes.

U.S. Pat. No. 4,501,232, by Gordbegli et al., issued Feb. 26, 1985 for Pool or Spa Water Heater, showing a heat exchanger with finned tubes.

U.S. Pat. No. 3,800,748, by Schindler et al., issued Apr. 2, 1974, and showing still another Fluid Heater Appliance with finned heat exchanger tubes.

U.S. Pat. No. 3,797,477, by Robert M. Ramey, issued Mar. 19, 1974 for Convertible Gas Heating Apparatus which shows a convertible top that may be used in the practice of the invention, and in which a heat exchanger according to the subject invention can be used in lieu of the heat exchanger pipe structure therein disclosed.

U.S. Pat. No. 3,623,458, by Leo Block, issued Nov. 30, 1971 for a Stackless Outdoor Heater Adapted for Swimming Pools.

U.S. Pat. No. 3,536,060, also by Leo Block, issued Oct. 27, 1970 for a Draft Hood, and showing a boiler or furnace construction in which the heat exchanger structure according to the subject invention can be used.

U.S. Pat. No. 3,421,482, by R. Ortega, issued Jan. 14, 1969 for an Outdoor Swimming Pool Heater in which the heat exchanger structure therein disclosed cab be used.

U.S. Pat. No. 3,292,598, by Avy L. Miller and Robert M. Ramey, issued Dec. 20, 1966 for a Water Heater including a heat exchanger with internal water bypass for which a heat exchanger according to the invention may be substituted.

Further applications, modifications and variations within the spirit and scope of the invention will be suggested by the subject extensive disclosure to those skilled in the art.

I/we claim:

1. In a method of transferring heat from a first fluid to a cooler second fluid with a heat exchanger having heat exchanger tubes, the improvement comprising in combination:

providing a heat source;

providing said first fluid from said heat source;

arranging said heat exchanger tubes on a triangle, with a first number of said heat exchanger tubes being exposed to said heat source and being located at and distributed along a base of said triangle, and a second number of said heat exchanger tubes being located at and between sides of said triangle between said base and an opposite apex of said triangle, and at least one further heat exchanger tube being located at said apex of the triangle;

providing for a flow of said first fluid from said heat source successively in heat-transfer relationship with said first number of heat exchanger tubes, with said second number of heat exchanger tubes, and with said further heat exchanger tube;

providing water to be heated as said cooler second fluid; and heating said water by providing for a flow of said water through said heat exchanger tubes.

2. In a method of transferring heat from a first fluid to a cooler second fluid with a heat exchanger having heat exchanger tubes, the improvement comprising in combination:

arranging said heat exchanger tubes on a triangle, with a first number of said heat exchanger tubes being located at and distributed along a base of said triangle, and a second number of said heat exchanger tubes being located at and between sides of said triangle between said base and an opposite apex of said triangle, and at least one further heat exchanger tube being located at said apex of the triangle;

subdividing said first number of heat exchanger tubes into sets of heat exchanger tubes;

connecting said sets of heat exchanger tubes in series with each other;

providing for a flow of said first fluid in heat-transfer relationship with said sets of heat exchanger tubes of said first number of heat exchanger tubes, and successively with said second number of heat exchanger tubes, and with said further heat exchanger tube; and providing for a flow of said cooler second fluid through said heat exchanger tubes including in series through said sets of heat exchanger tubes while exposed to said first fluid flow.

3. A method as in claim 2, wherein:

said first number of heat exchanger tubes is an even number of heat exchanger tubes; and said sets of heat exchanger tubes are provided by evenly subdividing said even number of heat exchanger tubes of said first number of heat exchanger tubes.

4. A method as in claim 2, wherein:

said second number of heat exchanger tubes are subdivided into further sets of heat exchanger tubes;

said further sets of heat exchanger tubes are connected in series with each other and with the sets of heat exchanger tubes of the first number of heat exchanger tubes.

5. A method as in claim 1, wherein:

said flow of the cooler second fluid is started at said further heat exchanger tube and proceeds through said second number of heat exchanger tubes, and through said first number of heat exchanger tubes in a counterflow to said flow of the first fluid.

6. In a method of transferring heat from a first fluid to a cooler second fluid with a heat exchanger having heat exchanger tubes, the improvement comprising in combination:

arranging said heat exchanger tubes on a triangle, with a first number of said heat exchanger tubes being located at and distributed along a base of said triangle, and a second number of said heat exchanger tubes being located at and between sides of said triangle between said base and an opposite apex of said triangle, and at least one further heat exchanger tube being located at said apex of the triangle;

providing additional heat exchanger tubes downstream of said apex in the direction of flow of the first fluid;

locating said further heat exchanger tube and said additional heat exchanger tube on the stem of a figure-Y whose arms coincide with said sides of said triangle;

providing for a flow of said first fluid successively in heat-transfer relationship with said first number of heat exchanger tubes, with said second number of heat exchanger tubes, and with said further heat exchanger tube; and providing for a flow of said cooler second fluid through said heat exchanger tubes.

7. A method as in claim 6, wherein:

said cooler second fluid is first flown through said additional heat exchanger tubes and through said further heat exchanger tube before proceeding through said second number of heat exchange tubes, and through said first number of heat exchanger tubes in a counterflow to said flow of the first fluid.

8. A method as in claim 1, wherein:

said flow of the first fluid is laterally confined to a fluid flow area of diminishing width in the direction of said flow of the first fluid.

9. A method as in claim 1, including:

providing a fluid flow area for said flow of the first fluid; and providing said fluid flow area with a first side substantially paralleling a first side of said triangle between said base and said apex, and with an opposite second side substantially paralleling an opposite side of said triangle.

10. A method as in claim 1, wherein:

said cooler second fluid is flown in a succession of fluid flow paths from said further heat exchanger tube through said first number of heat exchanger tubes, with each fluid flow path including at least two heat exchanger tubes.

11. A method as in claim 1, wherein:

said flow of said cooler second fluid is subjected to turbulation in said heat exchanger tubes.

12. A method as in claim 1, wherein:

said heat exchanger tubes are provided with heat exchanger fins; and baffles are used to confine the flow of said first fluid to spaces between the fins of at least some of said heat exchanger tubes.

13. A method as in claim 1, wherein:

additional heat exchanger tubes are located downstream of said apex in the direction of flow of the first fluid; and said cooler second fluid is first flown through at least said additional heat exchanger tubes and through said further heat exchanger tube before proceeding through said second number of heat exchanger tubes, and through said first number of heat exchanger tubes in a counterflow of said flow of the first fluid.

14. A method as in claim 13, wherein:

said further heat exchanger tube and said additional heat exchanger tubes are located on the stem of a figure-Y whose arms coincide with said sides of said triangle.

15. A method as in claim 1, wherein:

additional heat exchanger tubes are located downstream of said apex in the direction of flow of the first fluid; and said cooler second fluid is first flown in parallel through said additional heat exchanger tubes and through said further heat exchanger tube before proceeding through said second number of heat exchange tubes, and through said first number of heat exchanger tubes in a counterflow to said flow of the first fluid.

16. A method as in claim 15, wherein:

said further heat exchanger tubes and said additional heat exchanger tubes are located on the stem of a figure-Y whose arms coincide with said sides of said triangle.

17. In a method of transferring heat from a first fluid to a cooler second fluid with a heat exchanger having heat exchanger tubes, the improvement comprising in combination:

arranging said heat exchanger tubes transversely to a direction of first fluid flow in more than three rows of heat exchanger tubes in a Y-shaped pattern having a stem and having V-shaped arms on said stem;

providing for a flow of said first fluid successively downstream through said rows of heat exchanger tubes in heat-transfer relationship with the heat exchanger tubes;

providing each downstream row of heat exchanger tubes with less heat exchanger tubes than an adjacent upstream row of heat exchanger tubes as among at least the first three of said rows of heat exchanger tubes in said direction of first fluid flow; and providing for a flow of said cooler second fluid through said heat exchanger tubes.

18. A method as in claim 17, wherein:

said flow of the first fluid is laterally confined to a fluid flow area of diminishing width in the direction of said flow of the first fluid; and said diminishing fluid flow area is given a Y-shaped outline similar to and containing said Y-shaped pattern wherein said heat exchanger tubes are arranged.

19. A method as in claim 17, wherein:

said most downstream row is arranged on said stem and includes more than one of said heat exchanger tubes; and the heat exchanger tubes of the remaining rows are arranged on and between said V-shaped arms of said Y-shaped pattern.

20. In a method of transferring heat from a first fluid to a cooler second fluid with a heat exchanger having heat exchanger tubes, the improvement comprising in combination:

providing a heat source;

providing said first fluid from said heat source;

arranging said heat exchanger tubes transversely to a direction of first fluid flow in more than three rows of heat exchanger tubes;

providing for a flow of said first fluid successively downstream through said rows of heat exchanger tubes in heat-transfer relationship with the heat exchanger tubes;

providing each downstream row of heat exchanger tubes with less heat exchanger tubes than an adjacent upstream row of heat exchanger tubes as among at least the first three of said rows of heat exchanger tubes in said direction of first fluid flow;

providing water to be heated as said cooler second fluid; and heating said water by providing for a flow of said water through said heat exchanger tubes.

21. A method as in claim 17, wherein:

said flow of the cooler second fluid is started at the most downstream row and proceeds through said rows to the most upstream row in a counterflow to said flow of the first fluid.

22. A method as in claim 17, wherein:

heat exchanger tubes in adjacent rows are staggered relative to each other.

23. A method as in claim 17, wherein:

the most upstream one of said rows in a direction of said flow of the first fluid extends transversely as a row to said direction of flow; and the adjacent downstream one of said rows in said direction of flow also extends transversely as a row to said direction of flow.

24. A method as in claim 23, wherein:

the row next downstream of said adjacent one of said rows also extends transversely as a row to said direction of flow.

25. A method as in claim 23, wherein:

the most downstream one of said rows is occupied by a single heat exchanger tube.

26. A method as in claim 17, wherein:

said flow of the first fluid is laterally confined to said rows of heat exchanger tubes to provide a fluid flow area of diminishing width in the direction of said flow of the first fluid.

27. A method as in claim 17, wherein:

said flow of said cooler second fluid is subjected to turbulation in said heat exchanger tubes.

28. A method as in claim 17, wherein:

said heat exchanger tubes are provided with heat exchanger fins; and baffles are used to confine the flow of said first fluid to spaces between the fins of at least some of said heat exchanger tubes.

29. A method as in claim 17, wherein:

the most downstream one of said rows in said direction of flow extends in said direction of flow and includes more than one of said heat exchanger tubes.

30. A method as in claim 17, wherein:

said flow of the first fluid is laterally confined to said rows of heat exchanger tubes to a fluid flow area of diminishing width in the direction of said flow of the first fluid eventuating in a fluid flow channel containing said most downstream row and extending in said direction of flow of the first fluid.

31. A method as in claim 20, wherein:

said heat exchanger tubes are arranged on a triangle, with the first upstream one of said rows being located on a base of said triangle, an adjacent downstream one of said rows being located between said base and an opposite apex of said triangle, and a further downstream heat exchanger tube being located on said apex of the triangle.

32. A method as in claim 31, wherein:

said flow of the first fluid is laterally confined to said rows of heat exchanger tubes to provide a fluid flow area of diminishing width in the direction of said flow of the first fluid;

said fluid flow area being provided with a first side paralleling a first side of said triangle between said base and said apex, and with an opposite second side paralleling an opposite side of said triangle.

33. In apparatus for transferring heat from a first fluid to a cooler second fluid with a heat exchanger having heat exchanger tubes, the improvement comprising in combination:

a source of said first fluid including a heat source; and a heater for said cooler second fluid, comprising in combination:

a first number of said heat exchanger tubes located at and distributed along a base of a triangle and exposed to said heat source;

a second number of said heat exchanger tubes located at and between sides of said triangle between said base and an opposite apex of said triangle;

at least one further heat exchanger tube at said apex of the triangle;

a fluid flow passage for said first fluid extending from said heat source in heat-transfer relationship successively with said first number of heat exchanger tubes, with said second number of heat exchanger tubes, and with said further heat exchanger tube; and a fluid flow circuit for said cooler second fluid extending through said heat exchanger tubes of said heater.

34. In apparatus for transferring heat from a first fluid to a cooler second fluid with a heat exchanger having heat exchanger tubes, the improvement comprising in combination:

a first number of said heat exchanger tubes located at and distributed along a base of a triangle and subdivided into sets of heat exchanger tubes connected in series with each other;

a second number of said heat exchanger tubes located at and between sides of said triangle between said base and an opposite apex of said triangle;

at least one further heat exchanger tube at said apex of the triangle;

a fluid flow passage for said first fluid extending successively in heat-transfer relationship with said first number of heat exchanger tubes including said sets of heat exchanger tubes, and with said second number of heat exchanger tubes, and with said further heat exchanger tube; and a fluid flow circuit for said cooler second fluid extending through said heat exchanger tubes including said sets of heat exchanger tubes connected in series with each other.

35. Apparatus as in claim 34, wherein:

said first number of heat exchanger tubes is an even number of heat exchanger tubes; and said sets of heat exchanger tubes have the same number of heat exchanger tubes in each set of said first number of heat exchanger tubes.

36. Apparatus as in claim 34, wherein:

said second number of heat exchanger tubes are subdivided into further sets of heat exchanger tubes;

said further sets of heat exchanger tubes are connected in series with each other and with the sets of heat exchanger tubes of the first number of heat exchanger tubes.

37. Apparatus as in claim 33, wherein:

said fluid flow circuit extends successively through said heat exchanger tubes starting with said further heat exchanger tube and proceeding through said second number of heat exchanger tubes, and through said first number of heat exchanger tubes in a counterflow to said first fluid flow.

38. In apparatus for transferring heat from a first fluid to a cooler second fluid with a heat exchanger having heat exchanger tubes, the improvement comprising in combination:

a first number of said heat exchanger tubes located at and distributed along a base of a triangle;

a second number of said heat exchanger tubes located at and between sides of said triangle between said base and an opposite apex of said triangle;

at least one further heat exchanger tube at said apex of the triangle;

additional heat exchanger tubes downstream of said apex in said direction of first fluid flow;

said further heat exchanger tubes and said additional heat exchanger tubes located on the stem of a figure-Y whose arms coincide with said sides of said triangle;

a fluid flow passage for said first fluid extending successively in heat-transfer relationship with said first number of heat exchanger tubes, with said second number of heat exchanger tubes, and with said further heat exchanger tube; and a fluid flow circuit for said cooler second fluid extending through said heat exchanger tubes.

39. Apparatus as in claim 38, wherein:

said fluid flow circuit for the cooler second fluid extends first through said further heat exchanger tubes, and through said additional heat exchanger tube and hence through said second number of heat exchange tubes, and through said first number of heat exchanger tubes in a counterflow to said first fluid flow.

40. Apparatus as in claim 33, wherein:

said fluid flow passage diminishes in width in said direction of first fluid flow.

41. Apparatus as in claim 33, wherein:

said fluid flow passage has a first side substantially paralleling a first side of said triangle between said base and said apex, and an opposite second side substantially paralleling an opposite side of said triangle.

42. Apparatus as in claim 34, wherein:

said fluid flow circuit for said cooler second fluid extends successively through fluid flow paths from said further heat exchanger tube through further heat exchanger tubes, with each fluid flow path including at least two of said heat exchanger tubes.

43. Apparatus as in claim 33, wherein:

said first number of heat exchanger tubes is an even number of heat exchanger tubes;

said even number of heat exchanger tubes comprises sets of parallel heat exchanger tubes;

said sets of parallel heat exchanger tubes connected in series with each other; and said fluid flow circuit extends in series through said sets of parallel heat exchanger tubes.

44. Apparatus as in claim 33, wherein:

said first number of heat exchanger tubes is an even number of heat exchanger tubes;

said even number of heat exchanger tubes and said second number of and further heat exchanger tubes downstream of said upstream row are subdivided into sets of parallel heat exchanger tubes;

said sets of parallel heat exchanger tubes are connected in series with each other; and said fluid flow circuit extends in series through said sets of parallel heat exchanger tubes.

45. Apparatus as in claim 33, including:

fluid flow turbulators in said heat exchanger tubes.

46. Apparatus as in claim 33, including:

heat exchanger fins on said heat exchanger tubes;

fluid flow baffles on at least some of said heat exchanger fins.

47. Apparatus as in claim 33, wherein:

additional heat exchanger tubes are downstream of said apex in said direction of first fluid flow; and said fluid flow circuit for the cooler second fluid extends first through at least said additional heat exchanger tubes, and through said further heat exchanger tube and hence through said second number of heat exchanger tubes, and through said first number of heat exchanger tubes in a counterflow to said first fluid flow.

48. Apparatus as in claim 47, wherein:

said further heat exchanger tubes and said additional heat exchanger tubes are located on the stem of a figure-Y whose arms coincide with said sides of said triangle.

49. Apparatus as in claim 33, wherein:

additional heat exchanger tubes are downstream of said apex in said direction of first fluid flow; and said fluid flow circuit for the cooler second fluid extends first in parallel through said further heat exchanger tubes, and through said additional heat exchanger tube and hence through said second number of heat exchange tubes, and through said first number of heat exchanger tubes in a counterflow to said first fluid flow.

50. Apparatus as in claim 49, wherein:

said further heat exchanger tubes and said additional heat exchanger tubes are located on the stem of a figure-Y whose arms coincide with said sides of said triangle.

51. In apparatus for transferring heat from a first fluid to a cooler second fluid with a heat exchanger having heat exchanger tubes, the improvement comprising in combination:

heat exchanger tubes extending transversely to a direction of first fluid flow and arranged in more than three rows of heat exchanger tubes;

each downstream row of heat exchanger tubes having less heat exchanger tubes than an adjacent upstream row of heat exchanger tubes as among at least the first three of said rows of heat exchanger tubes in said direction of first fluid flow;

said heat exchanger tubes are in a Y-shaped pattern having a stem and having V-shaped arms on said stem;

a fluid flow passage for said first fluid extending successively downstream through said rows of heat exchanger tubes; and a fluid flow circuit for said cooler second fluid extending through said heat exchanger tubes.

52. Apparatus as in claim 51, wherein:

said fluid flow passage diminishes width in said direction of first fluid flow;

said diminishing fluid flow passage has a Y-shaped outline similar to and containing said Y-shaped pattern wherein said heat exchanger tubes are arranged.

53. Apparatus as in claim 51, wherein:

said most downstream row is on said stem and includes more than one of said heat exchanger tubes; and the heat exchanger tubes of the remaining rows are arranged on and between said V-shaped arms of said Y-shaped pattern.

54. In apparatus for transferring heat from a first fluid to a cooler second fluid with a heat exchanger having heat exchanger tubes, the improvement comprising in combination:

a source of said first fluid including a heat source; and a heater for said cooler second fluid, comprising in combination:

heat exchanger tubes extending transversely to a direction of first fluid flow and arranged in more than three rows of heat exchanger tubes;

each downstream row of heat exchanger tubes having less heat exchanger tubes than an adjacent upstream row of heat exchanger tubes as among at least the first three of said rows of heat exchanger tubes in said direction of first fluid flow;

a fluid flow passage for said first fluid extending successively downstream through said rows of heat exchanger tubes; and a fluid flow circuit for said cooler second fluid extending through said heat exchanger tubes of said heater.

55. Apparatus as in claim 51, wherein:

said fluid flow circuit extends successively through said heat exchanger tubes starting with the most downstream row and proceeding through said rows to the most upstream row in a counterflow to said first fluid flow.

56. Apparatus as in claim 51, wherein:

heat exchanger tubes in adjacent rows are staggered relative to each other.

57. Apparatus as in claim 51, wherein:

the most upstream one of said rows in a direction of first fluid flow extends transversely as a row to said direction of first fluid flow; and the adjacent downstream one of said rows in said direction of flow also extends transversely as a row to said direction of first fluid flow.

58. Apparatus as in claim 57, wherein:

the row next downstream of said adjacent one of said rows also extends transversely as a row to said direction of first fluid flow.

59. Apparatus as in claim 57, wherein:

the most downstream one of said rows is occupied by a single heat exchanger tube.

60. Apparatus as in claim 51, wherein:

said fluid flow passage diminishes in width in said direction of first fluid flow.

61. Apparatus as in claim 51, including:

fluid flow turbulators in said heat exchanger tubes.

62. Apparatus as in claim 51, including:

heat exchanger fins on said heat exchanger tubes;

fluid flow baffles on at least some of said heat exchanger fins.

63. Apparatus as in claim 51, wherein:

the most downstream one of said rows in said direction of first fluid flow extends in said direction of flow and includes more than one of said heat exchanger tubes.

64. Apparatus as in claim 54, wherein:

said fluid flow passage diminishes in width in said direction of first fluid flow and includes a fluid flow channel containing said most downstream row and extending in said direction of first fluid flow.

65. Apparatus as in claim 54, wherein:

said first upstream one of said rows is located on a base of a triangle, and adjacent downstream one of said rows is located between said base and an opposite apex of said triangle, and further downstream heat exchanger tube is located on said apex of the triangle.

66. Apparatus as in claim 65, wherein:

said fluid flow passage has a first side paralleling a first side of said triangle between said base and said apex, and an opposite second side paralleling an opposite side of said triangle.

67. Apparatus as in claim 51, wherein: said most upstream row has an even number of heat exchanger tubes;

said even number of heat exchanger tubes comprises sets of parallel heat exchanger tubes;

said sets of parallel heat exchanger tubes connected in series with each other; and said fluid flow circuit extends in series through said sets of parallel heat exchanger tubes.

* * * * *